US012603077B2

(12) United States Patent
Wang et al.

(10) Patent No.: US 12,603,077 B2
(45) Date of Patent: Apr. 14, 2026

(54) ACTIVE SOUND GENERATION DEVICE

(71) Applicant: Honda Motor Co., Ltd., Tokyo (JP)

(72) Inventors: Xun Wang, Saitama (JP); Toshio Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 18/426,380

(22) Filed: Jan. 30, 2024

(65) Prior Publication Data

US 2024/0274117 A1     Aug. 15, 2024

(30) Foreign Application Priority Data

Feb. 10, 2023     (CN) .......................... 202310097932.1

(51) Int. Cl.
*G10K 15/04*          (2006.01)
*B60Q 5/00*          (2006.01)
*H04R 1/22*          (2006.01)

(52) U.S. Cl.
CPC .............. *G10K 15/04* (2013.01); *B60Q 5/00* (2013.01); *H04R 1/22* (2013.01); *H04R 2499/13* (2013.01)

(58) Field of Classification Search
CPC ........ H04R 1/22; H04R 3/12; H04R 2430/00; H04R 2430/01; H04R 2499/13; G10K 15/04; G10K 15/02; B60Q 5/00
See application file for complete search history.

(56) References Cited

U.S. PATENT DOCUMENTS

2021/0201885 A1* 7/2021 Bastyr .............. G10K 11/17873
2021/0289286 A1* 9/2021 Marin .................... G10K 15/02

FOREIGN PATENT DOCUMENTS

WO          2022201520          9/2022

* cited by examiner

*Primary Examiner* — Jason R Kurr
(74) *Attorney, Agent, or Firm* — JCIPRNET

(57) ABSTRACT

An active sound generation device is proposed to generate a sound effect in a vehicle interior. The active sound generation device includes: a low sampling rate generation part, generating a low sampling rate signal by lowering a sampling rate; a processing frequency setting part, setting the sampling rate of the low sampling rate generation part; a high sampling rate generation part, amplifying a sampling rate of the low sampling rate signal to generate a high sampling rate signal as the sound effect; and a speaker, outputting the sound effect.

5 Claims, 8 Drawing Sheets

100

| Memory | | | | | | | | | |
|---|---|---|---|---|---|---|---|---|---|
| Vehicle speed (kph) | Filter coefficient | | | | | | | | |
| | Coefficient value | | | | | Coefficient value | | | |
| 10 | 0.0 | 0.32 | ... | 0.01 | ... | 0.0 | 0.35 | ... | 0.0 |
| ... | | | | | | | | | |
| 200 | | | | | | | | | |

FIG. 4B

| Memory | | | | | | | | | |
|---|---|---|---|---|---|---|---|---|---|
| FS(Hz) | Filter coefficient | | | | | | | | |
| | Coefficient value | | | | | Coefficient value | | | |
| 800 | 0.0 | 0.32 | ... | 0.01 | ... | 0.0 | 0.35 | ... | 0.0 |
| ... | | | | | | | | | |
| 4000 | | | | | | | | | |

FIG. 4A

| Priority | Linkage function No. |
|---|---|
| 0 | 1:DMS (Drowsiness detection) 〜156 |
| 1 | 2:DMS (Occupant detection) |
| 2 | 3: Calendar |
| ... | ... |

Memory

FIG. 5C

ACTIVE SOUND GENERATION DEVICE

CROSS-REFERENCE TO RELATED APPLICATION

This application claims the priority benefit of China application serial no. 202310097932.1, filed on Feb. 10, 2023. The entirety of the above-mentioned patent application is hereby incorporated by reference herein and made a part of this specification.

BACKGROUND

Technical Field

The disclosure relates to an active sound generation device.

Description of Related Art

In recent years, efforts to provide access to sustainable transportation systems that also take into account vulnerable persons such as the elderly, the disabled, and children among traffic participants have been active. In order to achieve the stated purpose, research and development efforts are made to further improve the safety and convenience of transportation through development related to the habitability of vehicles.

In conventional technology, active sound control (ASC) signal processing is based on ECU and cannot be directly applied to smart devices using buffering. Further, since the sampling rate adopted by smartphones, etc., is high (such as 48 kHz), an ASC algorithm with a low computational load is necessary.

As a problem, an active sound generation device is provided, which may operate on a device such as a smartphone with a low calculation amount. In addition, the ambience (tone) of the sound effect may be changed according to personal preferences, providing a new driving experience even in a vehicle that has been ridden for many years.

Thus, in the habitability of the vehicle, how to reduce the calculation amount so that the effect sound of the vehicle traveling may also be played by a smart device is the problem.

SUMMARY

The disclosure reduces the calculation amount so that the sound effect of the vehicle traveling may also be played by a smart device. Furthermore, this contributes to the development of sustainable transportation systems.

According to one embodiment of the disclosure, an active sound generation device is proposed to generate a sound effect in a vehicle interior. The active sound generation device includes: a low sampling rate generation part, generating a low sampling rate signal by lowering a sampling rate; a processing frequency setting part, setting the sampling rate of the low sampling rate generation part; a high sampling rate generation part, amplifying a sampling rate of the low sampling rate signal to generate a high sampling rate signal as the sound effect; and a speaker, outputting the sound effect.

According to the above embodiment, the active sound effect control application may be implemented, which may operate on smart devices such as smartphones with low calculation amount. Moreover, the active sound generation device may set the appropriate sampling rate at any time, and the sampling rate on the smart device side may be used to play the traveling sound effect. The embodiment may provide a safe, reliable, and comfortable driving experience. Further, through the data management format of a table, the system has good extensibility. In addition, the active sound generation device may provide necessary functions for each user and may realize the tone according to personal preference.

BRIEF DESCRIPTION OF THE DRAWINGS

FIG. 4A shows the example of setting up the table of sampling rates versus filter coefficients according to the embodiment of the disclosure.

FIG. 4B shows the example of setting up the table of vehicle speeds versus filter coefficients according to the embodiment of the disclosure.

FIG. 5C shows the example of the priority table output by the linkage function.

DESCRIPTION OF THE EMBODIMENTS

Figure 1:
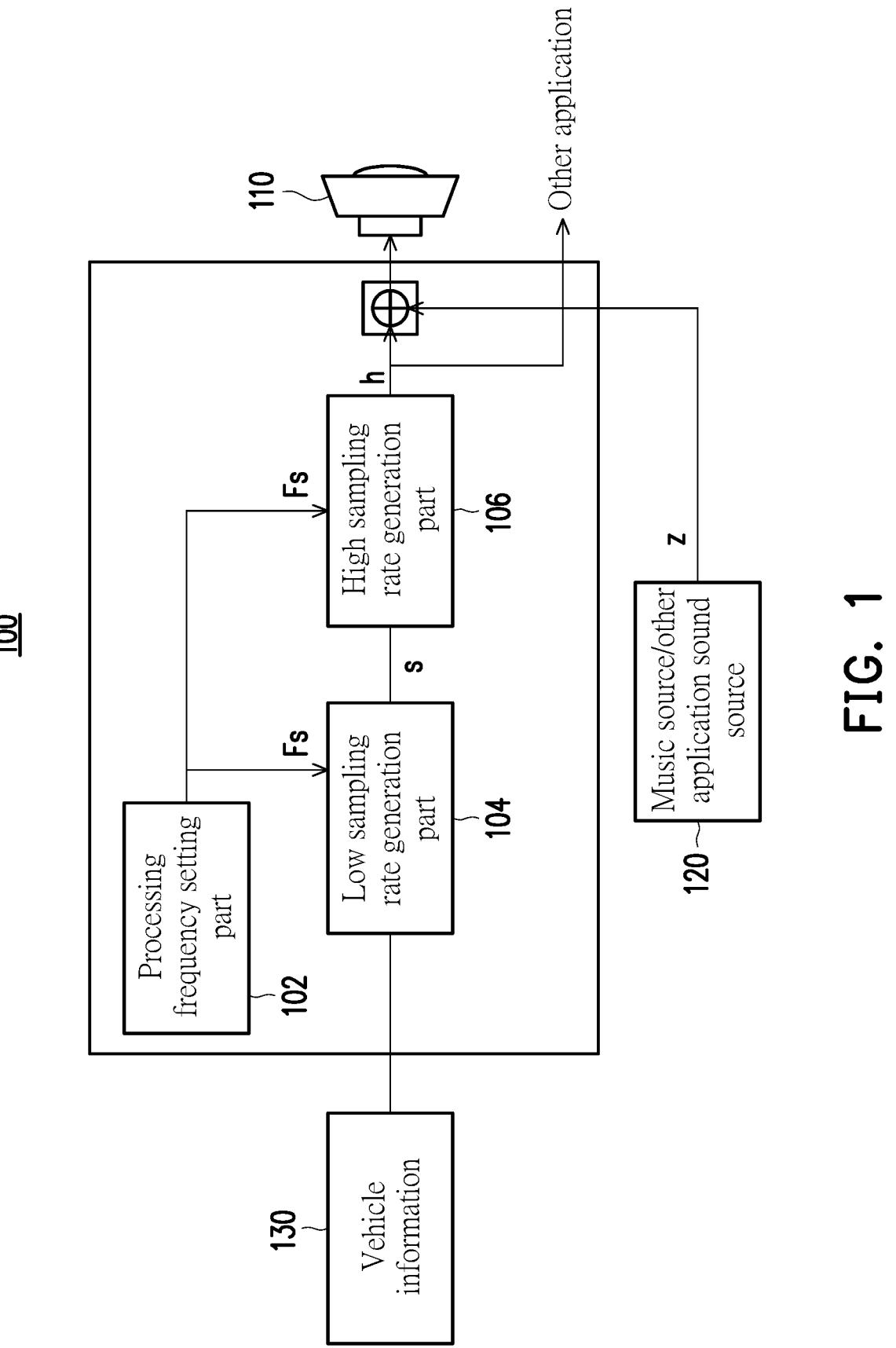
FIG. 1 shows the configuration schematic diagram of the active sound generation device according to the embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Even if the frequency component of the vehicle traveling sound is high, it is only a few kHz, so there is no need to process at a high sampling rate, such as 48 kHz for smart devices. Thus, by performing the generation processing of the sound effect at a low sampling rate (processing frequency), the calculation amount may be reduced. The generated sound effect signal is converted into a high sampling rate (48 kHz) through re-sampling processing, and the audio function may be shared with the sound source signal of other smart device applications such as music.

According to one embodiment of the disclosure, in the active sound generation device, the active sound generation device further includes: a sound source generation part, generating a sound source signal different from the sound effect; and a sound source synthesis part, synthesizing the sound source signal and the high sampling rate signal to generate a synthesized sound and output the synthesized sound through the speaker.

According to one embodiment of the disclosure, in the active sound generation device, the processing frequency setting part sets the sampling rate according to a highest frequency component of the sound effect.

According to one embodiment of the disclosure, in the active sound generation device, the vehicle includes a vehicle information acquisition part, configured to obtain a vehicle speed of the vehicle and a rotation speed of a driving force generation device of the vehicle. The active sound generation device further includes a sampling rate frequency table, configured to store the sampling rate corresponding to the vehicle speed or the rotation speed.

According to one embodiment of the disclosure, the active sound generation device further includes: a sound effect pattern selection part, configured to provide multiple sound effect patterns that are different from a tone of the sound effect. The sound effect pattern selection part selects from the sound effect patterns according to a condition of the vehicle or an operation of an occupant.

FIG. 1 shows the configuration schematic diagram of the active sound generation device according to the embodiment of the disclosure.

As shown in FIG. 1, an active sound generation device 100 is configured to generate a sound effect in a vehicle interior, which includes: a processing frequency setting part 102, a low sampling rate generation part 104, a high sampling rate generation part 106, and a speaker 110.

The processing frequency setting part 102 is configured to set the sampling rate of the low sampling rate generation part 104 and the high sampling rate generation part 106.

The processing frequency setting part 102 is configured to set the sampling rate Fs, that is, the processing frequency, of the generation processing of the traveling sound effect. The sampling rate Fs is provided to the low sampling rate generation part 104 and the high sampling rate generation part 106. The sampling rate of the processing frequency setting part 102 may be set in a variety of ways. Several possible ways are described below, but disclosure is not limited thereto, and other different methods may be used as long as it conforms to the concept of the disclosure.

According to one embodiment of the disclosure, the sampling rate Fs (processing frequency) used for the sound effect generation processing is preset as the system parameter. The parameter value is set according to the sampling theorem. For example, if the highest frequency component of the traveling sound effect is 1 kHz, then according to the sampling theorem, a sampling rate of at least twice that is required. That is, Fs must be >2 kHz in this case. Thus, the sampling rate Fs is set as follows.

$$Fs \geq 2 * fmax$$

fmax is the highest frequency component of the sound effect.

When the sampling rate Fs is set to 2 kHz, the processing frequency is $\frac{1}{24}$ of that of 48 kHz, so the calculation amount required to generate the sound effect may be greatly reduced.

According to one embodiment of the disclosure, since the fmax of the sound effect is determined by the system parameter that generates the sound effect waveform, the sampling rate Fs may be calculated and automatically set from the highest frequency component fmax.

$$Fs = M * fmax, \quad M \geq 2$$

Based on the sampling theorem, the multiple M is set. For example, with a little extra room, M=2.5 may be set. In this case, M becomes the system parameter.

As mentioned above, by setting the sampling rate Fs (sampling theorem) according to the highest frequency component of the sound effect, the sampling rate Fs may change according to the frequency of the sound effect (e.g., the acceleration sound when the vehicle is traveling). As a result, the calculation amount required for the sound effect generation may be reduced.

It can be seen from the above that by automatically setting the sampling rate Fs, if the waveform (tone) of the sound effect may be adjusted according to personal preferences as a function of the application, for the highest frequency component fmax of the changing sound effect, the computational load may always be kept low, and the required sampling rate Fs may also be set frequently.

The low sampling rate generation part 104 is used as the sound effect generation part to generate the sound effect. The low sampling rate generation part 104 reduces (or modulates) the sampling rate, thereby generating a low sampling rate signal. The sound effect is generated based on the vehicle information obtained outside the active sound generation device 100.

The low sampling rate generation part 104 generates a waveform signal of the sound effect based on the input vehicle information 130, such as the engine rotation speed and the vehicle speed. After that, the low sampling rate generation part 104 adjusts the overall volume of the sound effect based on the vehicle information 130 such as the engine rotation speed, the change in rotation speed, the vehicle speed, the acceleration, the accelerator opening degree (not limited thereto), thereby generating a sound effect signal. Also, as one embodiment, traditional sound effect generation logic circuits may also be used.

The high sampling rate generation part 106 is used as a re-sampling processing part. The high sampling rate generation part 106 receives the output s of the low sampling rate generation part 104, that is, it receives the low sampling sound effect signal s output by the low sampling rate generation part 104. After that, the high sampling rate generation part 106 amplifies (or demodulates) the sampling rate of the low sampling rate signal to generate a high sampling rate signal h.

In other words, the high sampling rate generation part 106 converts the sound effect signal s generated at the low sampling rate into the high sampling rate signal h used by the smart device and generates a buffered output signal (the sound effect signal at the high sampling rate). Afterwards, the high sampling rate signal (sound effect signal) h output by the high sampling rate generation part 106 may emit a sound effect in the car through the speaker 110.

In addition, the high sampling rate signal h output by the high sampling rate generation part 106 may not only emit the sound effect in the car through the speaker 110, but may also be directly transmitted to other applications (apps) that play sound and music in other smart devices. In this way, the sound effect is played by other application in the smart device.

In addition, according to one embodiment of the disclosure, the active sound generation device 100 may further include a sound source synthesis part 108 and a sound source generation part 120. The sound source generation part 120 is configured to generate or provide a sound source signal z different from the sound effect output by the low sampling rate generation part 104.

The sound source synthesis part 108 is provided between the output of the high sampling rate generation part 106 and the speaker 110. The sound source synthesis part 108 may synthesize the sound source signal z and the high sampling rate signal h to generate a synthesized sound and output the synthesized sound through the speaker 110.

The re-sampled sound effect signal is mixed with the 48 kHz sound source signal of other application such as music, and may be played from the speaker 110. In addition, the mixing process may be performed in the active sound control (ASC) application, or the re-sampling signal may be transmitted to other application, mixed in the other application, and then played.

From this, by synthesizing (mixing) the sound effect h with a high sampling rate and the sound source signal z (e.g., the music stored in the smartphone, the sound data of other application running on the smartphone, etc.) different from the sound effect h in the sound source synthesis part 108, the sound effect and the sound source signal of commonly used frequencies for smartphones and other smart devices may be simultaneously output. In this way, the occupant of the vehicle may play the acceleration sound effect from the smartphone when the vehicle is traveling while also listening to music, which increases the convenience of use.

From the above, according to the embodiment of the disclosure, when generating the sound effect (e.g., the acceleration sound of a vehicle traveling based on the information such as the vehicle speed or the engine rotation speed), the computational load may be reduced by reducing the sampling rate (modulation) with the processing frequency setting part 102. In addition, the sampling rate of the generated sound effect is amplified (demodulated) through the high sampling rate generation part 106 and then output from the speaker, which enables the output at a frequency commonly used in smart devices such as smartphones, thereby improving merchantability.

Figure 2:
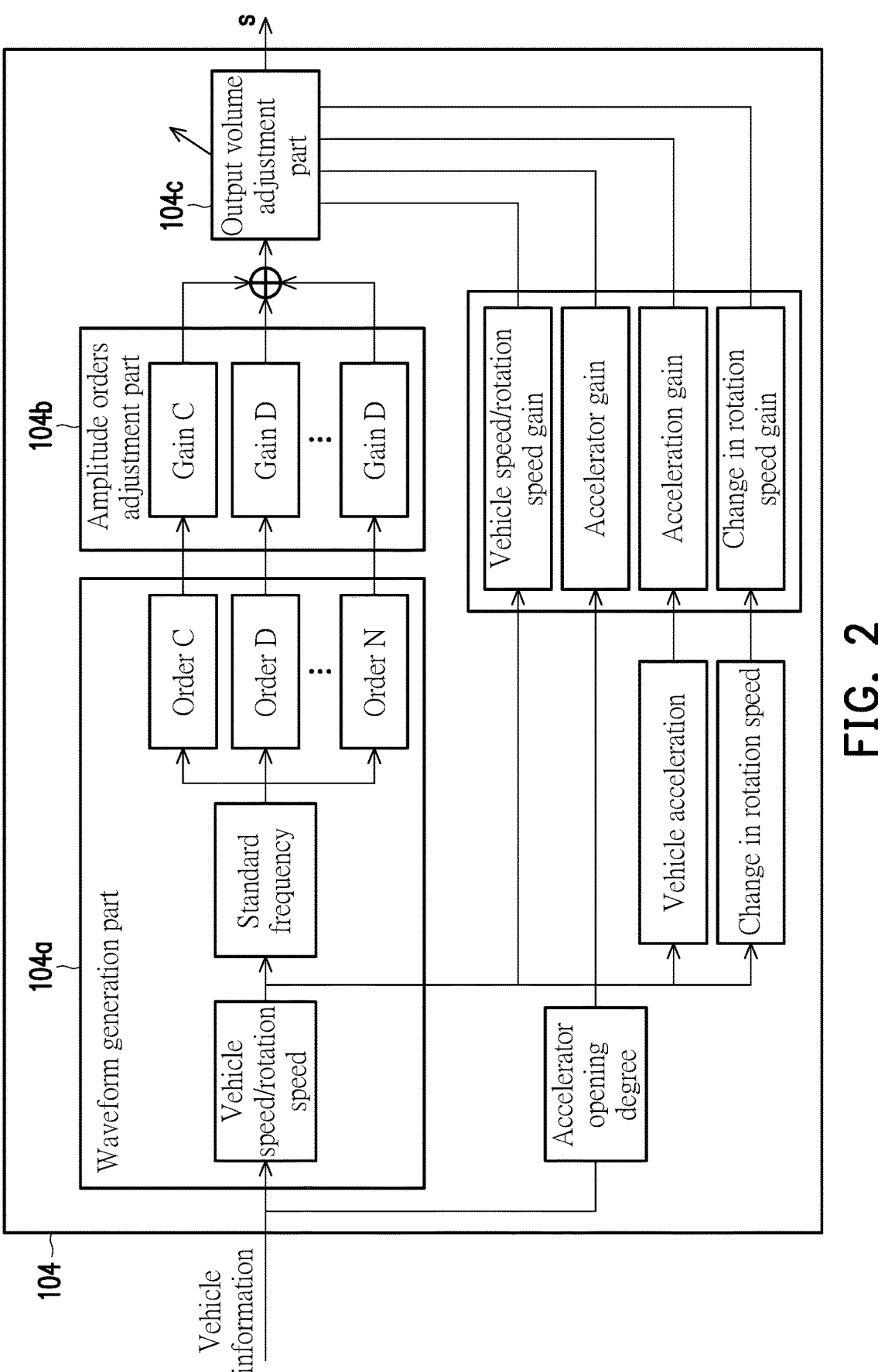
FIG. 2 shows the exemplary circuit diagram of the sound effect generation part (low sampling rate generation part) in the active sound generation device according to the embodiment of the disclosure.

FIG. 2 shows the exemplary circuit diagram of the sound effect generation part (low sampling rate generation part) in the active sound generation device according to the embodiment of the disclosure.

The low sampling rate generation part (sound effect generation part) 104 at least includes but is not limited to a waveform generation part 104a, an amplitude orders adjustment part 104b, an output volume adjustment part 104c, etc. The low sampling rate generation part 104 performs sampling at the sampling rate set by the processing frequency setting part 102. The low sampling rate generation part 104 receives the vehicle information 130. The vehicle information may include the vehicle speed and the rotation speed of the vehicle and the accelerator opening degree.

The waveform generation part 104a receives the information of the vehicle speed and the rotation speed of the vehicle and generates a standard frequency accordingly. After that, the standard frequency is expanded into order C, order D, . . . , order N. The amplitude orders adjustment part 104b then multiplies the expanded order C, order D, . . . , and order N by gain C, gain D, . . . , and gain N, respectively, and outputs the same to the adder for superimposition. The superimposed frequency signal is transmitted to the output volume adjustment part 104c, and after the gain adjustment is performed, the low sampling rate sound effect signal s is output.

Also, as shown in FIG. 2, from the information of the vehicle speed and the rotation speed of vehicle information, the information of the acceleration and the change in rotation speed of the vehicle may be obtained. According to the information of the vehicle speed, the rotation speed, the accelerator opening degree, the acceleration, and the change in rotation speed, the corresponding gain may be obtained, that is, the vehicle speed/rotation speed gain, the accelerator gain, the acceleration gain, the change in rotation speed gain, etc. These gain values are further transmitted to the output volume adjustment part 104c for adjusting the output volume.

Figure 3:
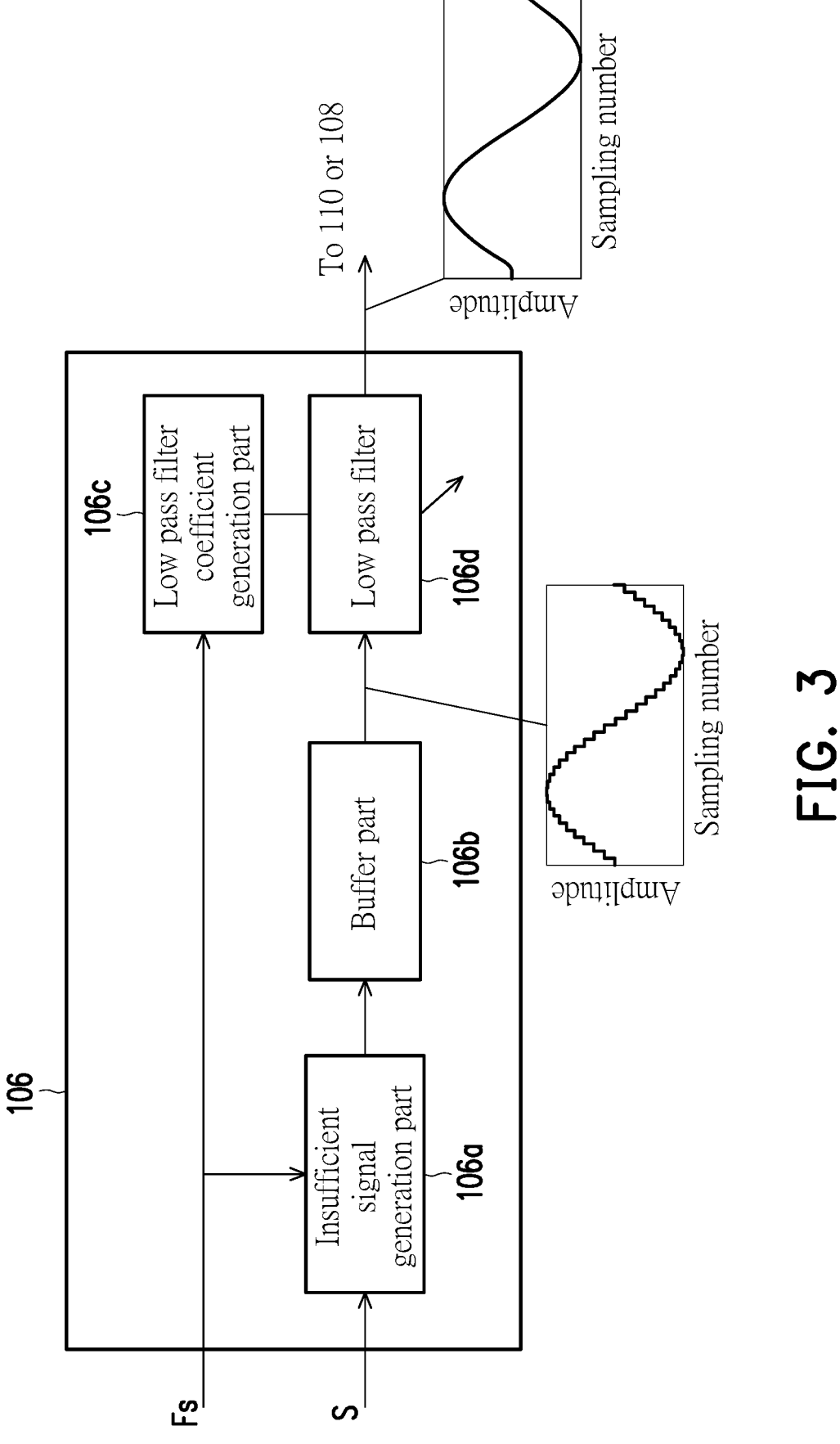
FIG. 3 shows the exemplary circuit diagram of the re-sampling processing part (high sampling rate generation part) in the active sound generation device according to the embodiment of the disclosure.

FIG. 3 shows the exemplary circuit diagram of the re-sampling processing part (high sampling rate generation part) in the active sound generation device according to the embodiment of the disclosure.

As shown in FIG. 3, as an example, the high sampling rate generation part (re-sampling processing part) 106 includes an insufficient signal generation part 106a, a buffer part 106b, a low pass filter coefficient generation part 106c, and a low pass filter 106d.

The insufficient signal generation part 106a receives the sampling rate Fs from the processing frequency setting part 102 and the sound effect signal s output by the low sampling rate generation part 104. If playback at a high sampling rate (e.g., 48 kHz) is desired, a copy is made to the sound effect signal s generated at the low sampling rate Fs to generate the required number of data. The copy number C may be calculated in the following equation.

$$C = Fsd/Fs$$

It may be seen from the above equation that when setting the system parameter Fs or M, it must be noted that C is an integer.

For 1 second of playback, 48,000 data are required. On the other hand, when the sampling rate Fs=2 kHz, 2000 sound effect signals are generated. Thus, in order to generate the number of data required for 1 second of playback, one piece of data is to be copied 24 times.

Further, as another method, the linear interpolation may be used. That is, using the linear interpolation, for the data of two points, the number of data becomes the copy number C.

The buffer part 106b receives the output of the insufficient signal generation part 106a. The buffer part 106b mainly stores the above copied sound effect signal string in the output buffer region. It is successively transmitted to the low pass filter 106d for the low-pass filtering processing.

After receiving the output of the buffer part 106b, the low pass filter 106d performs filtering processing thereon. The copied sound effect signal data sequence becomes a step-like signal waveform (number of samples vs. amplitude) as output by the buffer part 106b in FIG. 2 when being buffered and connected. This step-like signal is configured by the actual frequency to be generated and the harmonic components thereof (as known as the folding noise or the aliasing noise, with a frequency between Fs/2 and Fs). Thus, after removing the harmonics by using the low pass filter 106d, only the actual frequency component is extracted (smooth waveform shown in the figure (number of samples vs amplitude)).

The low pass filter coefficient generation part 106c is configured to provide a filter coefficient to the low pass filter 106d. In one embodiment, if the sampling rate Fs of the processing frequency setting part 102 is set automatically, the low pass filter coefficient generation part 106c may set the cutoff frequency Fc of the low pass filter 106d according to the change in the sampling rate Fs, thereby regenerating the filter coefficient of the low pass filter 106d. The relationship between the cutoff frequency Fc and the sampling rate Fs may be calculated, for example, by the following equation.

$$F_c = \frac{F_s}{L}, \quad L \geqq 2$$

According to one embodiment of the disclosure, the correspondence relationship between the filter coefficients and the sampling rate Fs may be stored in the memory using a lookup table (i.e., sampling rate frequency table), as shown in FIG. 4A. In addition, when the sampling rate Fs is set according to the vehicle speed or the rotation speed, the filter coefficients may be stored in the memory in the form of a lookup table of the correspondence relationship between the vehicle speed or the rotation speed and the filter coefficients, as shown in FIG. 4B. For example, the vehicle may include a vehicle information acquisition part to obtain the vehicle speed and the rotation speed of a driving force generation device of the vehicle (such as an engine, motor, etc.). The active sound generation device 100 may further include the above-mentioned sampling rate frequency table to store the sampling rate corresponding to the vehicle speed or the rotation speed.

From the above, the embodiment of the disclosure may make the sampling rate Fs required for the sound effect variable, and may reduce the computational load for generating the sound effect. Specifically, by obtaining the vehicle speed, the maximum frequency corresponding to the vehicle speed may be determined, so the sampling rate Fs may be easily set according to the vehicle speed, and the calculation amount may be reduced.

Figure 5A:
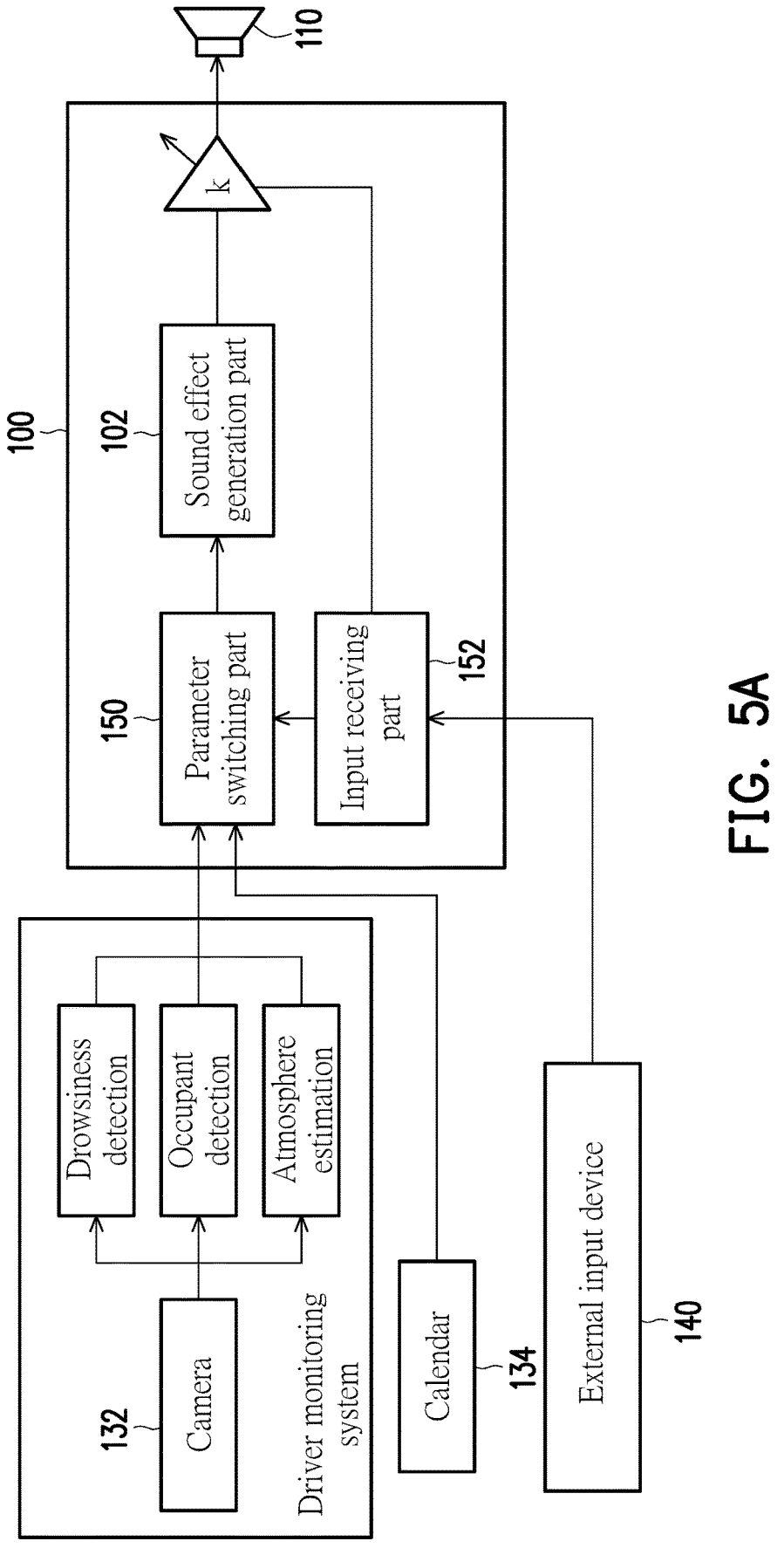
FIG. 5A shows the configuration schematic diagram of the active sound generation device according to another embodiment of the disclosure.

FIG. 5A shows the configuration schematic diagram of the active sound generation device according to another embodiment of the disclosure. As shown in FIG. 5A, the active sound generation device 100 may also include a sound effect pattern selection part to provide multiple sound effect patterns that are different from a tone of the sound effect. The sound effect pattern selection part selects from the sound effect patterns according to a condition of the vehicle or an operation of an occupant.

As the sound effect pattern selection part, for example, the parameter switching part 150 in the figure may be used. The condition of the vehicle may be monitored by, for example, the driver monitoring system (DMS). For example, the driver monitoring system DMS may include, but is not limited to, a camera 132, configured to photograph the condition of the vehicle interior and determine the condition of the vehicle interior. For example, the camera 132 may be configured to determine and detect many conditions such as drowsiness detection, occupant detection, and atmosphere estimation. The detection result of the driver monitoring system DMS may be transmitted to the parameter switching part 150.

In addition, today's itinerary content may also be provided to the parameter switching part 150 through the calendar (application) 134. In addition, the external input device 140 may be used by an occupant to operate and input information. The active sound generation device 100 may receive this information through the input receiving part 160 and transmit the same to the parameter switching part 150. The external input device 140 is, for example, an external device that may be input by hand, such as a touch panel.

In order to provide a safe and secure driving experience, for example, by cooperating with the driver monitoring system (DMS), the driver's drowsiness is detected and a warning is issued, and then an exciting sound effect is generated to prevent drowsiness. Further, when it is detected that children or families are riding in the vehicle, the volume of the sound effect may be reduced and the tone may be switched to a soft tone. In addition, to always provide a refreshing driving experience, for example, it is considered to switch the tone based on different days in a week (provided by the calendar 134).

Thus, based on the above description, the above various tone adjustments may be performed through the parameter switching part 150. The parameter switching part 150 may perform the parameter switching based on the detection result of the driver monitoring system DMS, the input of the calendar 134 and the external input device 140, etc., and then select from multiple sound effect patterns.

Figure 5B:
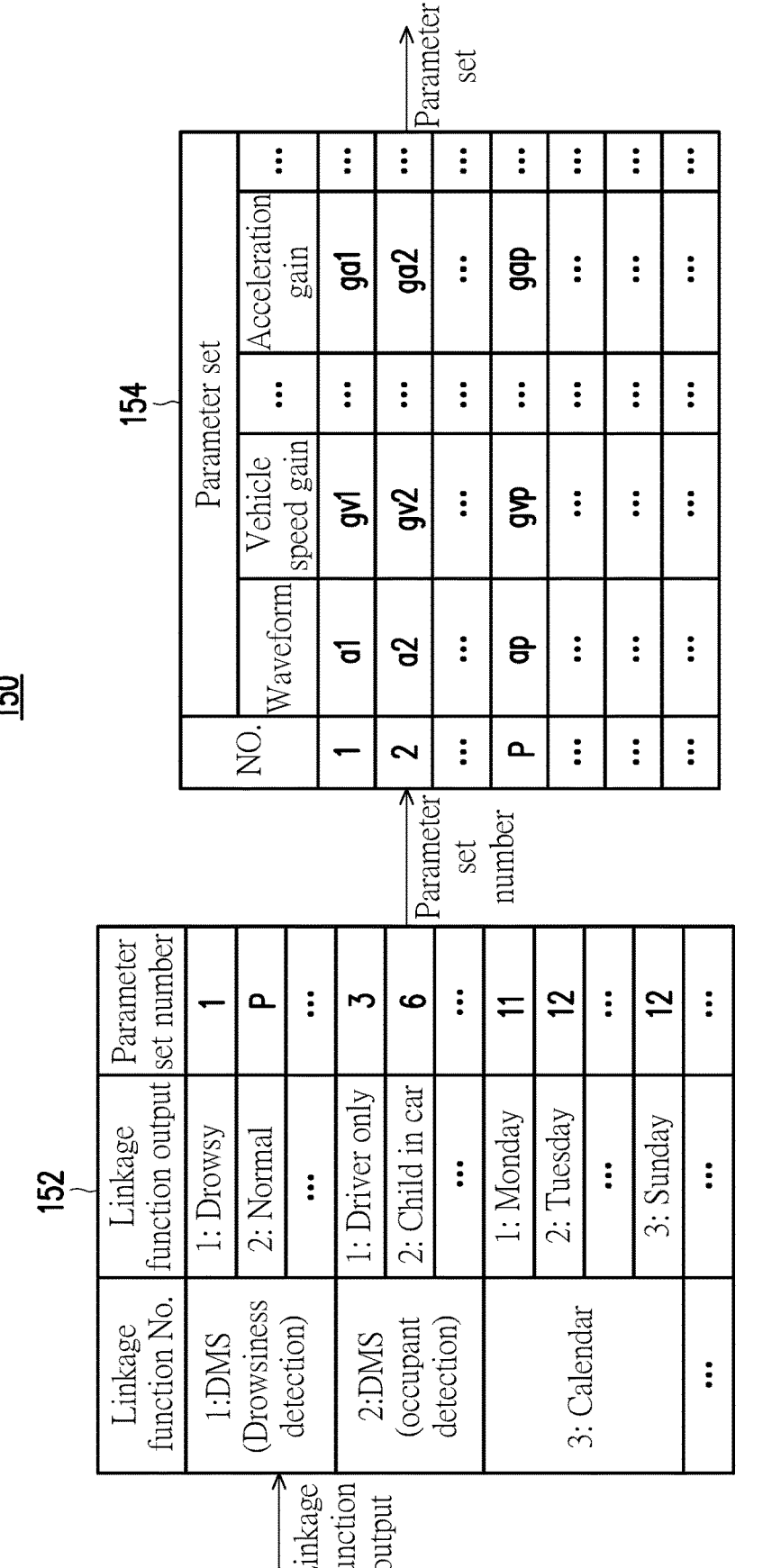
FIG. 5B shows the block diagram of the parameter switching part of FIG. 5A.

As shown in FIG. 5B, the parameter switching part 150 may include a linkage function output table 152 and a parameter set table 154. The linkage function output table 152 is a table that lists linkage functions, linkage function outputs, and parameter set numbers and stores the same in the memory. The linkage functions are, for example, functions provided by the driver monitoring system DMS, the calendar 134, the external input device 140, etc. The linkage function output represents, for example, the detection result of the driver monitoring system DMS, the information provided by the calendar 134, the information input by the external input device 140, etc. The parameter set number provides a corresponding number for each linkage function output. Here, the ASC parameter set (hereinafter referred to as the parameter set) is assigned a number and stored in a table format. In addition, the linkage function and the output thereof are also numbered. This associates one output of one function with a parameter set number. The output of the linkage function and the correspondence relationship between the parameter sets may be stored in a table.

In addition, when the system selects one of the parameter set numbers from the linkage function output table 152, it is provided to the parameter set table 154. After that, the system selects one corresponding parameter set from the parameter set table 154 based on the parameter set number, and then outputs the parameter set to the sound effect generation part. Each parameter set includes, for example, various parameters such as the waveform, the vehicle speed gain, the acceleration gain, etc. Thus, for example, the sound effect generation part (low sampling rate generation part) 104 in FIG. 2 may generate the corresponding sound effect, thereby realizing the tone switching.

When multiple external functions cooperate with the active sound generation device 100, the output of each linkage function may be prioritized to determine which output of the linkage function is used to switch the tone. FIG. 5C shows a priority table 156. The priority of the output of each linkage function is managed in the form of a table. For example, the smaller the number, the higher the priority level.

The external input device 140 receives the information input by the user's hand to control the system. Items that the user may input include the parameter set number settings, the linkage function priority settings, the sound effect volume settings, the sound effect on/off (ON/OFF, such as setting the volume setting to 0), etc. According to the above input, the input is received by the input receiving part 160 and transmitted to the parameter switching part 150, thereby changing the parameters in the system.

Also, regarding the priority of the linkage function, since the priority of the drowsiness detection function is high, for the sake of safety, the highest priority of the drowsiness detection function does not need to be changed. The same is true for the volume setting. The sound effect of the drowsiness detection function may be set to a certain volume or above, for example, to the highest volume.

From the above, the calculation amount may be reduced through the form of a table. By managing the sound effect data in the form of a table, a variety of active sound control (ASC) may be realized, which improves the extensibility of the system.

Figure 6:
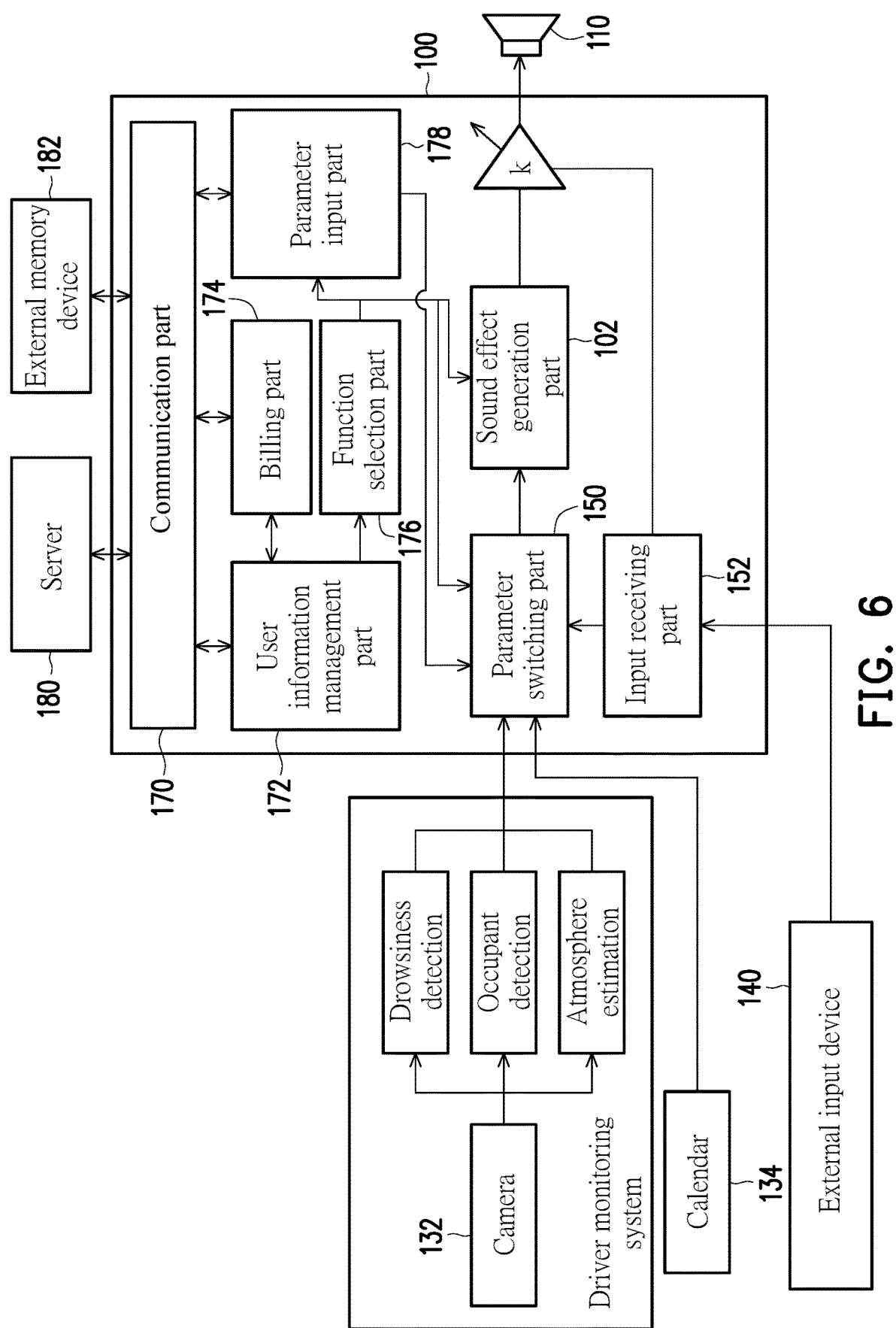
FIG. 6 shows the configuration schematic diagram of the active sound generation device according to another embodiment of the disclosure.

FIG. 6 shows the configuration schematic diagram of the active sound generation device according to another embodiment of the disclosure. In order to provide necessary functions to necessary users, the configuration shown in FIG. 6 adds functions such as the user information, the permission management, and the function control through permissions. In addition, in order to realize the tone according to personal preferences, the server and the external memory device are provided, so that parameters may be obtained externally.

As shown in FIG. 6, the active sound generation device 100 further includes: a communication part 170, a user information management part 172, a billing part 174, a function selection part 176, and a parameter input part 178.

The communication part 170 may communicate with the external server 180 or the external memory device 182 through various usable communication protocols such as wired network, wireless network, USB, etc.

The user information management part 172 may communicate with the server 180 based on the user name/password and perform login/logout functions. In addition, the user information management part 172 may also include a function of acquiring or updating necessary user information such as permissions from the server.

The billing part 174 may communicate with external financial institutions through the communication part 170 and process the user's payment, etc. In addition, the billing part 174 may transmit the payment results to the user information management part 172. The user information management part 172 updates the user's permission based on the payment result.

The function selection part 176 may select the available functions of the user according to the user's permission and display the same on the user interface (UI).

The parameter input part 178 may download the parameter set (sound effect) from the external memory device 182 or the server 180 through the communication part and store the downloaded parameter set in the parameter set table 154 of the parameter switching part 150.

Through the above embodiment, the user may purchase the parameter set of the desired sound effect and download the same from the server 180 or the external memory device 182. In addition, the personally set parameter set may also be stored in a network space such as a USB flash drive or OneDrive and imported into the active sound generation device 100.

According to the above embodiment of the disclosure, the active sound effect control application may be implemented, which may operate on smart devices such as smartphones with low calculation amount. Moreover, the active sound generation device may set the appropriate sampling rate at any time. Furthermore, the sampling rate on the smart device side may be used to play the traveling sound effect.

The embodiment of the disclosure may provide a safe, reliable, and comfortable driving experience. Further, through the data management format of a table, the system has good extensibility. In addition, the active sound generation device may provide necessary functions for each user and may realize the tone according to personal preference.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. An active sound generation device, configured to generate a sound effect in a vehicle interior, comprising:
   a low sampling rate generation part, generating a low sampling rate signal by lowering a sampling rate;
   a processing frequency setting part, setting the sampling rate of the low sampling rate generation part;
   a high sampling rate generation part, amplifying the sampling rate of the low sampling rate signal to generate a high sampling rate signal as the sound effect; and
   a speaker, outputting the sound effect, wherein
   the vehicle comprises a vehicle information acquisition part, configured to obtain a vehicle speed of the vehicle and a rotation speed of a driving force generation device of the vehicle, and
   the active sound generation device further comprises a sampling rate frequency table, configured to store the sampling rate corresponding to the vehicle speed or the rotation speed,
   wherein the processing frequency setting part is configured to:
   set the sampling rate according to the sampling rate frequency table and the vehicle speed or the rotation speed obtained by the vehicle information acquisition part; and
   provide the sampling rate to the low sampling rate generation part and the high sampling rate generation part.

2. The active sound generation device according to claim 1, further comprising:
   a sound source generation part, generating a sound source signal different from the sound effect; and
   a sound source synthesis part, synthesizing the sound source signal and the high sampling rate signal to generate a synthesized sound and output the synthesized sound through the speaker.

3. The active sound generation device according to claim 1, wherein
   the processing frequency setting part sets the sampling rate according to a highest frequency component of the sound effect.

4. The active sound generation device according to claim 1, further comprising:
   a sound effect pattern selection part, configured to provide a plurality of sound effect patterns that are different from a tone of the sound effect, wherein
   the sound effect pattern selection part selects from the sound effect patterns according to a condition of the vehicle or an operation of an occupant.

5. The active sound generation device according to claim 1, wherein
   the high sampling rate generation part is further configured to determine an amplifying factor, based on the sampling rate provided from the processing frequency setting part, for amplifying the sampling rate of the low sampling rate signal.

* * * * *